(12) United States Patent
Latour (10) Patent No.: US 7,100,161 B2
(45) Date of Patent: Aug. 29, 2006

(54) METHOD AND APPARATUS FOR RESOURCE ACCESS SYNCHRONIZATION

(75) Inventor: Jean-Francois Latour, Dublin (IE)

(73) Assignee: Sun Microsystems, Inc., Santa Clara, CA (US)

( * ) Notice: Subject to any disclaimer, the term of this patent is extended or adjusted under 35 U.S.C. 154(b) by 590 days.

(21) Appl. No.: 09/928,618

(22) Filed: Aug. 13, 2001

(65) Prior Publication Data

US 2002/0078123 A1    Jun. 20, 2002

(30) Foreign Application Priority Data

Oct. 20, 2000    (EP) .................................... 309238

(51) Int. Cl.
*G06F 9/46*    (2006.01)
(52) U.S. Cl. ...................... 718/102; 710/240; 718/104
(58) Field of Classification Search ................ 718/102, 718/104, 107; 710/240
See application file for complete search history.

(56) References Cited

U.S. PATENT DOCUMENTS 5,630,130 A * 5/1997 Perotto et al. .............. 718/107
5,872,980 A * 2/1999 Derrick et al. .............. 710/200
5,895,492 A   4/1999 Greenspan et al.
6,473,820 B1 * 10/2002 Zhang ......................... 710/240

FOREIGN PATENT DOCUMENTS

EP    0 747 814 A1   12/1996
EP    0 943 993 A2    9/1999

OTHER PUBLICATIONS

Jang Seung-Ju et al: "Spin—Block Synchronization Algorithm In The Shared Memory Multiprocessor System", Operating Systems Review (SIGOPS), US, ACM Headquarter, New York; vol. 28, No. 4; Oct. 1, 1994; pp. 15-30.
Mellor-Crummey, J.M. et al: "Algorithms For Scalable Synchronization On Shared-Memory Multiprocessors", ACM Transactions on Computer Systems, US, Association for Computing Machinery, New York; vol. 9, No. 1; Feb. 1, 1991; pp. 21-65.
Communication pursuant to Article 96(2) EPC for Application No. 00 309 238.4—1243, May 18, 2005.
Magnusson, et al, "Queue Locks on Cache Coherent Multiprocessors," Proceedings Eighth International Parallel Processing Symposium, US, IEEE Computer Society Press, Apr. 26, 1994, pp. 165-171.

* cited by examiner

*Primary Examiner*—Meng-Al T. An
*Assistant Examiner*—Camquy Truong
(74) *Attorney, Agent, or Firm*—Robert C. Kowert; Meyertons, Hood, Kivlin, Kowert & Goetzel, P.C.

(57) ABSTRACT

A resource access control mechanism for a multi-threaded computing environment associates a sequence of one or more mutexes with a resource. When a requesting thread attempts to access the resource, a mutex is locked and allocated to the requesting thread, and if a previous mutex in the sequence is present, an attempt to lock the previous mutex is made. If the previous mutex is already locked, the requesting thread is suspended until the previous mutex is unlocked.

40 Claims, 8 Drawing Sheets

METHOD AND APPARATUS FOR RESOURCE ACCESS SYNCHRONIZATION

BACKGROUND OF THE INVENTION

1. Field of the Invention

The invention relates generally to resource access synchronization in computer systems.

2. Description of Related Art

In a multi-threaded programming environment, there is often a need to serialize the access to a shared resource. Sometimes it is also necessary that the individual threads access the resource in the order in which they have requested access.

One method of achieving serialization is through the use of a mutex lock. A mutex is a class of object in a computing environment that enables mutual exclusion support. It is used to ensure serialization of access to a resource by acquiring and releasing a lock on that resource. At any one time only one method or function can "lock" the resource. A mutex has two pieces of state, a lock bit and a queue of function/argument pairs defining methods or functions waiting to acquire the lock. Thus, a mutex enables the resource to be allocated to a single requesting thread at a time. However, the manner in which mutexes are implemented does not guarantee that a lock will be acquired by a thread in the order in which the threads have requested access to it.

An example of a situation where it is necessary to serialize access to a shared resource in such a manner that access to the resource by individual threads is permitted in the order in which the access has been requested, is in the context of a server that handles requests with multiple threads. Requests usually involve access to server resources. If several requests concerning the same resource arrive in a specific order, then the correct behavior is to access the resource sequentially (thread serialization) and in the same order (order preservation).

Consider an example of a print server that receives the following requests:

1. Create a job on a printer;
2. Add document 1 to the job;
3. Add document 2 to the job;
4. Print the job.

The threads that handle those requests must clearly have access to the printer resource in the required order in order that the job is handled in the correct manner. If a mutex is provided to protect the printer resource, this will be set by the thread that currently has control of the printer resource. As the "create a job" thread is the first to make a request for the printer resource, the "create a job" thread will initially lock the mutex and gain control of that resource. While the "create a job" thread is active, any subsequent thread that request the resource will be blocked on that mutex. When the first request (i.e. the "create a job" thread) has completed its action, the next thread that acquires the lock on the mutex will not necessarily be the "add document 1" thread. This is because conventional mutex control does not provide any access ordering. Accordingly, if the "print job" thread were the next thread to lock the mutex, a job would be printed before any documents have been added to the job.

In order to address this, the classical solution to controlling the order of access to the resource is to introduce a task object. Individual tasks can then be put in a queue, and can be activated by a task manager in the correct order. In such an example, each time a resource requests an access to a resource, a separate task object is created, and the task object is put in a queue in the order in which the requests are received. A separate thread will act as a process to control the order in which the individual task objects are activated to carry out the tasks concerned.

However, such a solution requires a significant overhead in the amount of programming code necessary for implementation.

Also, it is to be noted that servers are often implemented using a framework that operates across platforms, gives no control on the way that the threads handle requests and provides a unified interface for various platform specific mutex implementations.

Accordingly, there is a need for a more efficient solution to the provision of serializing thread access to resources, with access order preservation.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In one aspect, the invention provides a resource access control mechanism for a multi-thread computing environment. The mechanism is operable to manage a sequence, or list, of one or more mutexes, wherein the sequence of mutexes is associated with a resource and each mutex may be allocated to one thread. The mechanism is operable, when a thread requests access to the resource, to lock a mutex, wherein the locked mutex is allocated to the requesting thread and to attempt to lock a previous mutex in the sequence if present. The requesting thread is suspended if the previous mutex is already locked until the previous mutex is unlocked in response to a previous thread finishing access to the resource.

The management of a sequence of mutexes for a sequence of threads, with each thread being associated with a respective mutex and the additional linking of a thread to the mutex for a previous thread in the sequence, ensures that access by the threads to a resource can be serialized so that only one thread may access the resource at any given time. Management of the sequence of mutexes further preserves the order of access requests. The mechanism ensures that each mutex becomes the head, or controlling, mutex when a previous mutex has been released in response to the previous thread finishing access to the resource.

In one implementation, when the previous mutex is already unlocked, or is unlocked in response to the previous thread completing its access to the resource, the previous mutex is temporarily locked by the requesting thread. This provides a way of resolving the attempt to lock the previous mutex by the requesting thread and provides a way of confirming the ordering of the mutexes. In this implementation, therefore, when the previous mutex is unlocked, the mechanism locks the previous mutex on behalf of the requesting thread and then unlocks the previous mutex on behalf of the requesting thread. At that time, the mutex allocated to the requesting thread becomes the head, or controlling, mutex.

The mutex allocated to the requesting thread remains the head, or controlling, mutex until that mutex is unlocked in response to the requesting thread completing its access to the resource. At that time, the next mutex, if there is one, in the sequence, becomes the head, or controlling, mutex, and so on.

An internal mutex can be provided in the mechanism to protect the locking of the requesting mutex.

In a specific example, the resource comprises a print function.

The sequence of mutexes can be held in an array, a ring buffer, a linked list, a circular linked list, or any other suitable data structure that enables the order to be preserved.

Another aspect of the invention provides a resource access control program for a multi-thread computing environment. The program comprises program code operable to manage a sequence of mutexes wherein the sequence of mutexes is associated with a resource and each mutex may be allocated to one thread. The program code is operable to respond to a call from a thread requesting access to the resource, by locking a mutex for the requesting thread, wherein the mutex is allocated to the requesting thread, and by attempting to lock a previous mutex in the sequence if present. In this way, the requesting thread is suspended if the previous mutex is already locked until the previous mutex is unlocked in response to a previous thread finishing access to the resource.

The computer program can be provided as a computer program product with the program carried on a carrier medium. The carrier medium can be a storage medium or a transmission medium, for example.

A further aspect of the invention provides a computer system comprising a processor, memory, the memory storing a method for controlling access to a resource for a multi-thread computer environment as described below.

Yet a further aspect of the invention provides a method of resource access control for a multi-threaded computing environment. The method manages a sequence of one or more mutexes, wherein the sequence of mutexes is associated with a resource, and each mutex may be allocated to one thread. When a requesting thread attempts an access to the resource, a mutex in the sequence is locked for the thread. Also, an attempt is made to lock a previous mutex in the sequence if present. Thus, the requesting thread is suspended if the previous mutex is already locked until the previous mutex is unlocked in response to a previous thread finishing access to the resource.

An embodiment of the invention thus provides a reliable and efficient method and apparatus for controlling the order of access to a shared resource by a plurality of separate threads in a multi-threaded environment.

BRIEF DESCRIPTION OF THE DRAWINGS

Exemplary embodiments of the present invention will be described hereinafter, by way of example only, with reference to the accompanying drawings in which like reference signs relate to like elements and in which.

In the drawings and the following detailed description, elements with the same reference numeral are the same element.

DETAILED DESCRIPTION

Exemplary embodiments of the present invention are described in the following with reference to the accompanying drawings.

Figure 1:
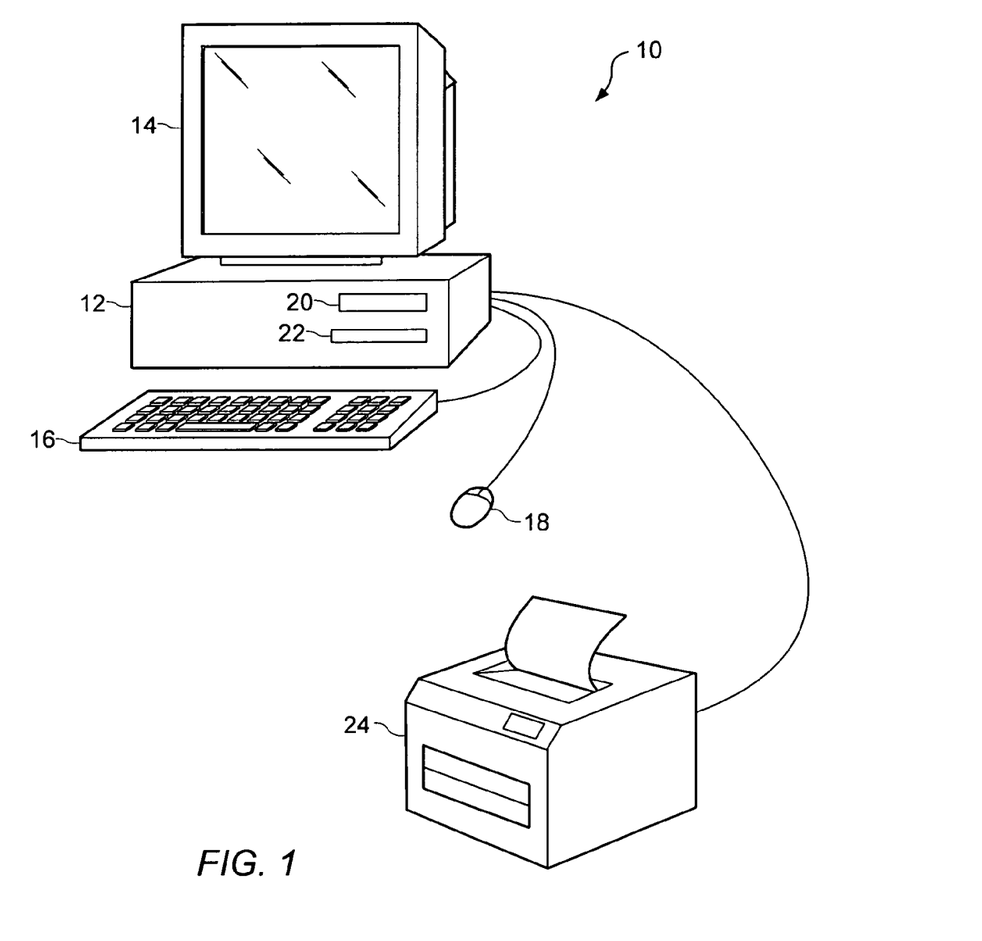
FIG. 1 is a schematic representation of a computer station in which an embodiment of the present invention can be implemented.

FIG. 1 is a schematic representation of a computer station, for example a personal computer or another form of computer 10 in which an embodiment of the present invention may be implemented. The computer 10 shown in FIG. 1 is illustrated as a desktop-type computer. However, the computer could be configured as a tower computer or in any other appropriate form. As represented in FIG. 1, the computer 10 includes a system unit 12 that contains a processor, memory, etc, and also includes one or more media drives 20/22. Connected to the system unit 12 is a printer 24. Also connected to the system unit 12 are a keyboard 16 and a pointing device 18, for example a mouse. A display unit, or monitor 14 is also provided for the computer 10, this also being connected to the system unit 12.

Figure 2:
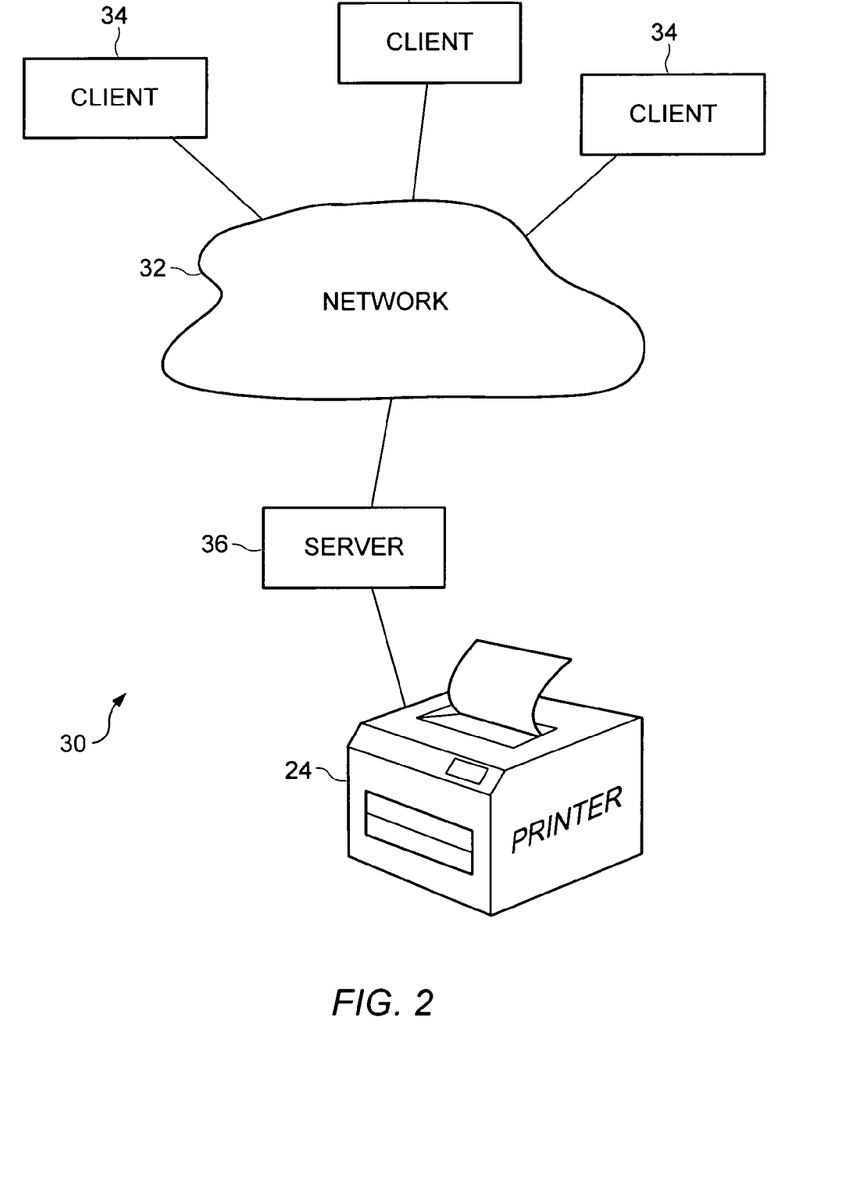
FIG. 2 is a schematic representation of a network-based computer environment in which an embodiment of the present invention can be implemented.

FIG. 2 is a schematic representation of another possible configuration of a computer system in which an embodiment of the present invention may be implemented. The computer system 30 illustrated in FIG. 2 is a network-based computer system, including a plurality of client computer stations 34 and a server computer station 36, the client computer stations and the server computer station being connected by a network 32. The network 32 could be a local area network, a wide area network, an intranet, the Internet, or any other computer network. The server computer 36 supports and controls the operation of a printer 24. Each of the computer stations 34 and 36 could be implemented by a computer station such as the computer 10 illustrated in FIG. 1. Alternatively, the computer stations 34 and 36 could be configured in any other appropriate conventional manner.

Figure 3:
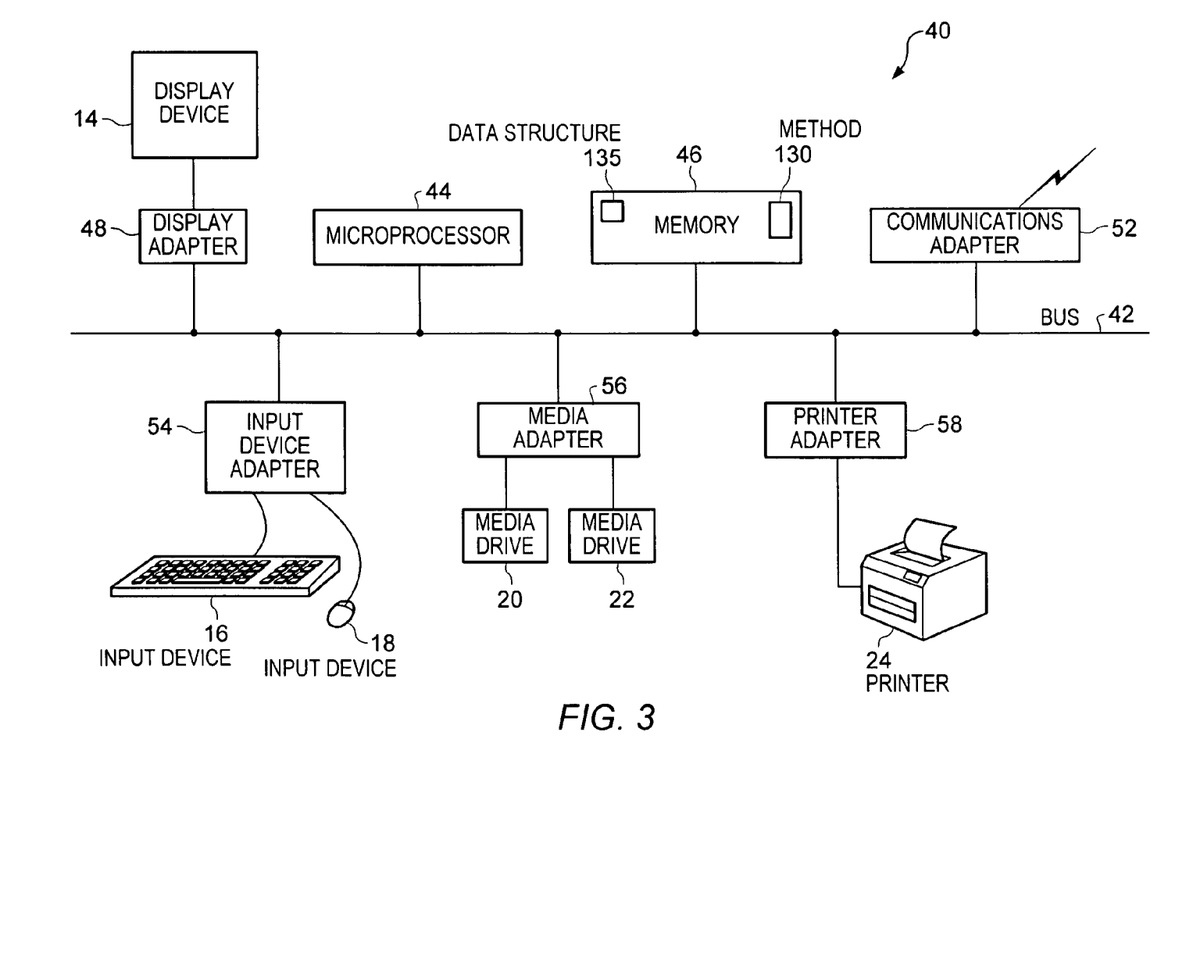
FIG. 3 is a schematic block representation of computer hardware on which an embodiment of the present invention can be implemented.

FIG. 3 is a schematic functional block diagram representing various hardware components that could be provided in a computer system such as the computer system of FIG. 1, or in one or more of the computer stations 34/36 shown in FIG. 2. As shown in FIG. 3, the hardware configuration 40 of the computer includes a microprocessor 44 and main memory 46 interconnected by a bus 42. Also connected to the bus 42 is a display adapter 48 for supporting a display device such as the display device 14 of FIG. 1. One or more communications adapters 52 can be provided for connecting the computer hardware of FIG. 3 to one or more other computers, for example, for connecting a computer such as the server computer 36 of FIG. 2 to the network 32 shown in FIG. 2. The communications adapter(s) 52 are connected to the bus 42. An input device adapter 54 connects the user input devices 16/18 to the bus 42. One or more media adapters 56 are used for connecting the media drives 20/22 to the bus 42. A printer adapter 58 is used for connecting the printer 24 to the bus 42.

In one embodiment of the present invention, shown in FIG. 3, a method 130 is stored in memory 46 and is executed on a central processing unit (CPU) (shown in FIG. 3 as microprocessor 44) to allow serialized access to a shared resource with preservation of access order. In FIG. 3, computer readable data structure 135 contains one or more resource access synchronization objects. Preferably, the resource access synchronization object comprises a mutex.

An embodiment of the present invention will be described in the context of a server, for example a server 36, for controlling access to a printer resource using the printer 24. As represented in FIGS. 1-3, the printer 24 is directly connected to the server 36 for use by multiple users connected via the network to the server. It should be appreciated that the printer 24 could, as an alternative to being connected directly to the server computer 36, be connected thereto via the network 32.

Also, it should be understood that although the invention is described in the context of a printer server, the invention is not solely applicable to printer servers, or indeed to servers in general, but is more generally applicable to any multi-threaded environment where serialized access is required to any form of resource, whether that be a printer, or any other form of hardware or software resource.

Figure 4:
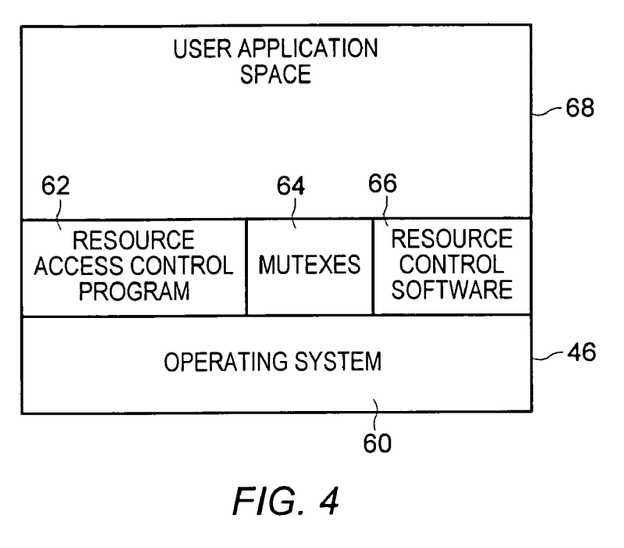
FIG. 4 is a schematic overview of software components of a system such as that shown in FIG. 3.

FIG. 4 is a schematic representation of software components that can be included in a typical implementation of the present invention. FIG. 4 represents software components held within the main memory 46 of a computer system such as that represented in FIG. 3. Thus, the software components include an operating system 60, a resource access program 62 which provides a resource access control mechanism, and a list, or sequence, of mutexes 64 that is controlled by the resource access control program 62. In the present embodiment, which relates to the control of access to a printer resource, printer resource control software 66 is also provided. The printer control software can include one or more printer drivers and higher-level printer functions, in a conventional manner. User application programs can be held within user application space 68.

Figure 5:
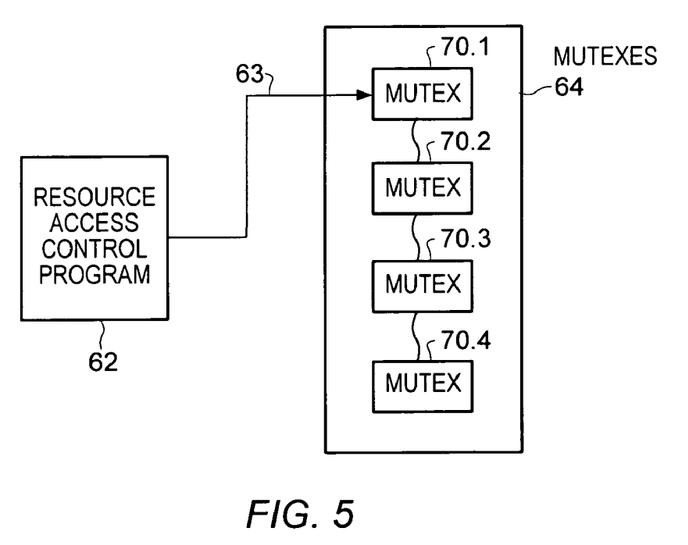
FIG. 5 is a schematic block diagram of a mechanism for implementing the present invention.

FIG. 5 is a schematic representation of the relationship between the resource access control program 62 and the mutex storage 64. As represented in FIG. 5, the mutex storage 64 includes a list of mutexes 70 including mutexes 70.1, 70.2, 70.3 and 70.4. The resource access control program 62 is operable to control and sequence the mutexes 70 so that the mutexes control access to the resource by various threads in the order in which the threads request access to the resource. The resource access control program 62 is also operable to allocate one mutex to each thread that requests access to the resource. In one embodiment of the invention, the resource access control program 62 includes a pointer 68 to a head, or conrolling mutex 70.1 in the list of mutexes 70.

The organization of the list, or sequence, of mutexes 70 can be achieved in any of a number of ways that can ensure the appropriate ordering.

Figure 6:
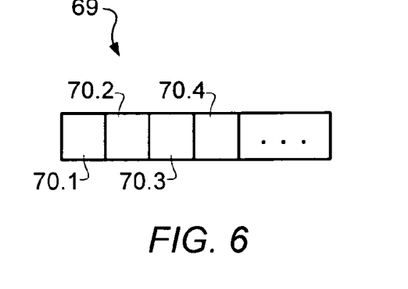
FIGS. 6–9 indicate alternative storage methodologies for use in an embodiment of the present invention.

FIG. 6 illustrates a further example of an implementation of a list of mutexes arranged as an array 69, where each mutex is allocated to a respective entry within the array 69. Conventional array addressing can be used. Where an array is used for mutex storage, the number of array elements determines the maximum number of threads that can ever access the resource.

Figure 7:
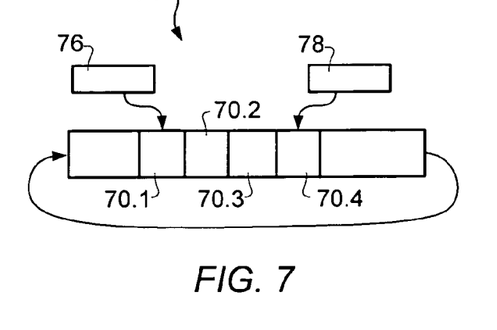

FIG. 7 is a schematic representation of another implementation of a list in the form of a ring buffer 74, access to which is controlled by a head pointer 76 pointing to the head of the list of mutexes 70 (e.g., pointing to the mutex 70.1) and a tail pointer is 78 pointing to the tail of the list of mutexes, (e.g., pointing to the mutex 70.4). The pointers 76 and 78 are controlled in a conventional manner to point to the head and tail of the list of active elements (the mutexes 70.1–70.4). Where a ring buffer is used for mutex storage, the number of storage locations in the ring determines the maximum number of threads that can access the resource at any one time.

Figure 8:
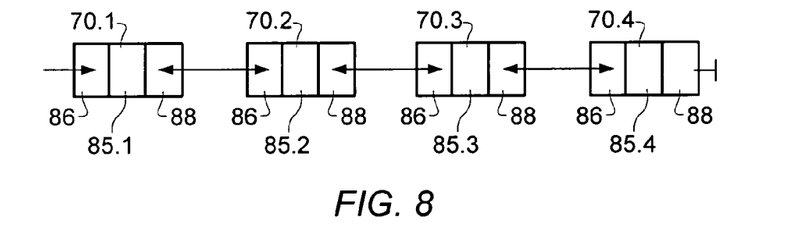

FIG. 8 is an alternative implementation of a list of mutexes in the form of a bi-directional linked list 84. Each of the mutexes is effected as a linked list entry 85, with each linked list entry 85 having a pointer 86 to a preceding linked list entry and a pointer 88 to a subsequent linked list entry. Conventional linked list control can be effected. Where an open ended linked list is used, this provides an open ended number of threads that can access the resource (limited only by the available memory capacity). However, the counter to this is that the amount of memory needed to implement the linked list is not controlled.

Figure 9:
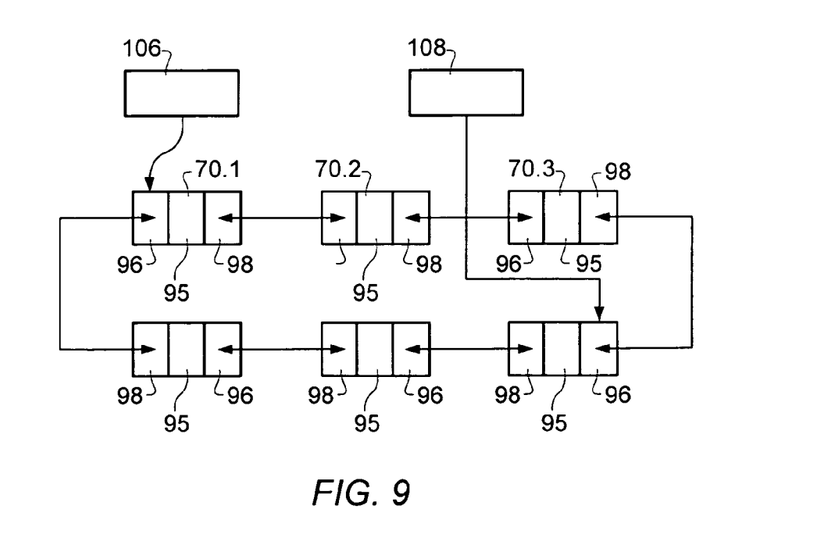

FIG. 9 illustrates the storage approach used in preferred embodiment of the invention. This uses a circular linked list, which is a combination of a bi-directional linked list and a ring buffer. As for a ring buffer, access to the circular linked list is controlled by a head pointer 106 pointing to the head of the list of mutexes 70 (e.g., pointing to the mutex 70.1) and a tail pointer is 108 pointing to the tail of the list of mutexes, (e.g., pointing to the mutex 70.4). However, rather than a simple ring buffer, each of the mutexes is effected as a linked list entry 95, with each linked list entry 95 having a pointer 96 to a preceding linked list entry and a pointer 98 to a subsequent linked list entry so as to form a ring, or circle, of linked list entries. The use of the circular linked list buffer provides flexibility in that the size of the ring can readily be changed. In this manner, the number of storage locations in the ring can readily be changed to take account of changing circumstances, while still exercising control over the memory required.

As mentioned above, an embodiment of the invention can be implemented in an environment such as described above. An embodiment of the invention enables not only serialization of resource access, but also order preservation. An embodiment of the invention makes use of a sequence, or list, of mutexes based on conventional mutexes known in the art, but with one mutex allocated to each thread. The list of mutexes is controlled in a first-in-first-out manner to ensure serialization and order preservation. When a given thread wishes to access the resource protected by the mutexes, a mutex is locked for the given thread and then an attempt is made to lock a previous mutex, if there is one. If a previous mutex is locked by a previous thread (i.e. the previous thread is still actively using the resource or is blocked on an earlier mutex), then the given thread is unable to lock the previous mutex and accordingly is blocked, or suspended, until the previous mutex is released. When the previous mutex is released in response to the previous thread completing its access to the resource, the previous mutex can then be locked and subsequently be released on behalf of the given thread. The mutex that was locked for the given thread is then promoted to being at the head of the list, and thus becomes the controlling mutex for access to the resource. The given thread is then able to access to the resource. As there is a one-to-one relationship between threads and mutexes, there is no acquisition order issue. This should become clearer from the following exemplary embodiments.

In a first example described with reference to FIGS. 10 and 11, a new mutex is created and added to the list, or sequence, of mutexes when required and is removed from the list and destroyed when it is no longer required.

Figure 10:
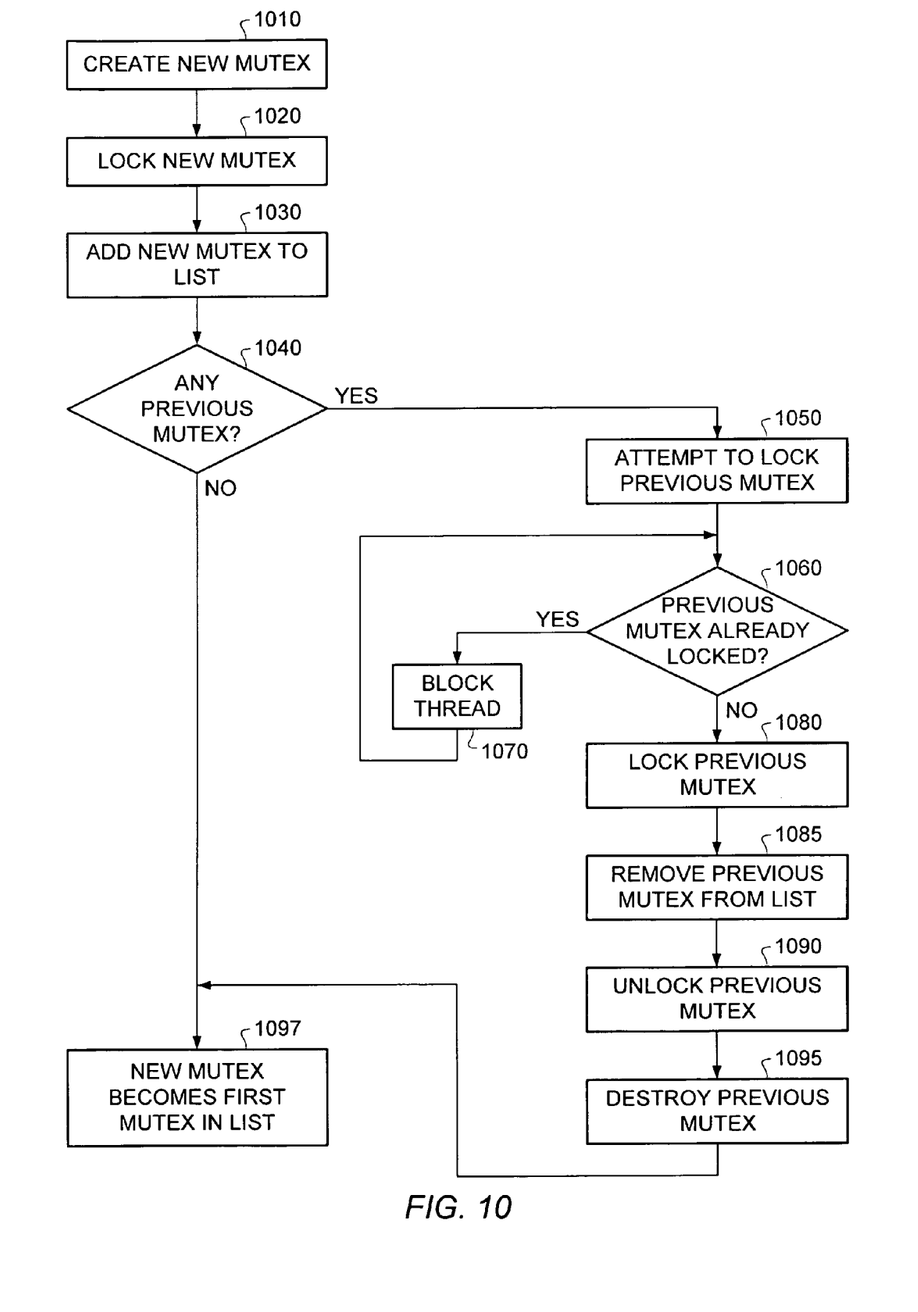
FIG. 10 is a process flow diagram illustrating the control of a sequence of mutexes for an embodiment of the present invention.

FIG. 10 is a process flow diagram illustrating resource access control by a resource access control program 62 in one embodiment of the invention. In particular, FIG. 10 illustrates the acquisition of a mutex where a thread calls a lock mutex method that creates and adds mutexes to a list of active mutexes when required and then removes from the list and destroys the mutexes when they are no longer required.

In operation 1010, the lock method creates a new mutex object for the requesting thread that has called it, that is a given, or "new" thread that wishes to access the resource.

In operation 1020, a mutex object corresponding to the requesting thread, a "new" mutex, is locked. However, this operation does not perform a blocking operation on the thread.

In operation 1030, the new mutex is added to the list of mutexes as the last mutex of that list.

In operation 1040, a test is made as to whether any previous mutexes are provided in the list. If the answer is yes, then in operation 1050, an attempt is made to lock the previous mutex. If, in operation 1060 it is found that the previous mutex is already locked by a previous thread that is still active or is awaiting activation, then in operation 1070, execution of the new thread is blocked, or suspended.

The new thread is only released in operation 1080 when the previous mutex for which a locking attempt was made in operation 1050, is released by an unlock method (compare FIG. 11 described below) called by the previous thread to which that previous mutex was allocated. At this time, the new thread is able to lock the previous mutex and is then operable in operation 1085 to remove that previous mutex from the list of mutexes.

In operation 1090, the previous mutex is unlocked.

In operation 1095, the previous mutex is destroyed.

Then, in operation 1097, or in the situation that there were no previous mutexes in the list at operation 1040, the new mutex becomes the head mutex of the list whereby the thread associated with that mutex becomes the thread that has control over the protected resource and it is then operable to carry out the necessary operation on that protected resource.

It will be noted FIG. 10 does not include an operation of unlocking the new mutex. This is because this is performed by a separate unlock method in response to a separate call from the new thread when it has finished accessing the resource.

Figure 11:
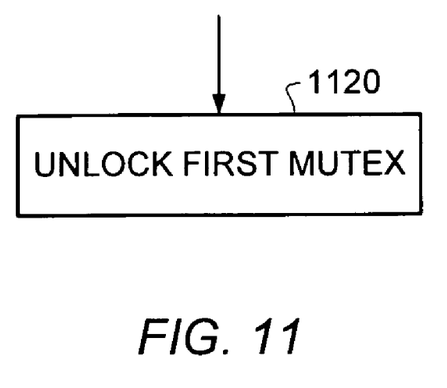
FIG. 11 is a process flow diagram illustrating the release of a mutex for an embodiment of the present invention.

FIG. 11 is a schematic flow diagram illustrating the release of the mutex allocated to a given mutex when that thread has finished the protected operation on the resource. In particular, FIG. 11 illustrates the step performed by an unlock method in response to the thread that called the lock method of FIG. 10 when it wanted to access the resource, subsequently calling the unlock method when it has finished with the resource. Thus, in operation 1120 the unlock method unlocks the head mutex in the list, that is the mutex associated with the thread that called the method.

It will be noted that FIG. 11 does not show the removal of the mutex from the list and the destroying of that mutex. This is because this is performed by an instance of the lock method of FIG. 10 resulting from a call by a following thread.

As mentioned above, FIG. 10 illustrates an exemplary embodiment where mutexes are created and added to a list of active mutexes when required and are then removed from the list and destroyed when they are no longer required. However, in a preferred embodiment of the invention, mutexes are pre-allocated to the elements in the circular linked list of FIG. 9, avoiding the need actively to create mutexes and to add them to the list when required and to remove them from the list and destroy them when they are no longer required.

Table 1 below illustrates an example of program code for a lock method that is called by a thread to implement resource acquisition in a manner similar to that described with reference to FIG. 10, but where mutexes are pre-allocated to a circular linked list data structure. As a result, the method described in Table 1 does not need to implement operations 1010, 1035, 1085, and 1090 of FIG. 10.

TABLE 1

| | |
|---|---|
| void lock ( ) | |
| { | //L01 |
|    internal-mutex.lock ( ); | //L02 |
|    if (end->next == begin) { | //L03 |
|      cerr << "ring full" << end1; | //L04 |
|      exit (−1); | //L05 |
|    } | //L06 |
|    Mutex* m = end; | //L07 |
|    end = end->next; | //L08 |
|    end->lock ( ); //for the next one | //L09 |
|    internal__mutex.unlock ( ); | //L10 |
| m->lock ( ); | //L11 |
|    //waiting... | //L12 |
|    //waiting... | //L13 |
|    //waiting... | //L14 |
|    //awaked! | //L15 |
|    internal-mutex.lock ( ); | //L16 |
|    begin = m->next; | //L17 |
|    internal__mutex.unlock ( ); | //L18 |
|    m->unlock ( ); | //L19 |
| } | //L20 |

In Table 1, the lines in the table are labeled L1–L20 as comments behind the "//" symbol. It will be appreciated that these do not form part of the program code, but are provided to assist in the following explanation of the lock method of Table 1.

Lines L01 and L20 bracket the lock method program code.

Lines L02 and L10 form internal mutex lock and unlock instructions for protecting a critical section of the program code.

In that section of code, line L03 checks whether the circular linked list is full (i.e. if stepping from the mutex entry at the tail (end) of the sequence of mutexes in the circular linked list gives the mutex entry at the head (begin) of the sequence), and if so then in lines L04–L06 an error message is generated and the lock method exits.

Line L07 sets the mutex entry "m" is set to the mutex entry for the tail (end) of the sequence. This corresponds to the mutex locked by the last thread to request access to the resource (i.e. the "previous" mutex for the "previous" thread using the terminology used elsewhere herein).

Line L08 sets an "end" mutex entry is set to the next mutex entry following the "m" entry (i.e. the "new" mutex for the "new" thread using the terminology used elsewhere herein).

Line L09 corresponds to operation 1020 of FIG. 10 (i.e. the new mutex is locked).

Line L11 corresponds to operation 1050 of FIG. 10 (i.e. the lock method attempts to lock the previous mutex).

Lines L12–L14 are not program code. These lines represent the situation where the previous mutex is locked by the previous thread so that the new thread is blocked, or suspended, pending the unlocking of the previous mutex in response to the previous thread completing its access to the resource.

Line L15 is also not program code. This line represents the releasing of the new thread on the unlocking of the previous mutex in response to the previous thread completing its access to the resource.

Lines L16 and L18 form internal mutex lock and unlock instructions for protecting a second critical section of the program code.

Line L17 forms the second critical section of code, which moves the head of the sequence of mutexes from the mutex entry "m" to the next mutex entry. This corresponds to operation 1097 in FIG. 10, wherein the new mutex becomes the head mutex in sequence of mutexes, whereby this becomes the controlling mutex, and enables the new thread to access the resource. It should be understood that at this time the so-called "new" thread may not be the latest thread to request access to the resource and that the end, or tail, of the sequence may have moved on around the circular linked list.

Line L19 corresponds to operation 1090 of FIG. 10 (i.e. the lock method unlocks the previous mutex).

It will be noted that operations 1090 and 1097 are ordered differently compared to the steps performed by the program code at lines L17 and L19. This is because in the programmed implementation of Table 1, the order of the steps performed by the program code at lines L16–L18 and that performed by the program code at step L19 is immaterial and could be reversed.

Table 2 is an example of an unlock method that is called by a thread to implement a resource release as described with reference to FIG. 11. The unlock method illustrated in Table 2 can be used in combination with both a method as described in FIG. 10 (where active creation and destruction of mutexes is performed) and with a method as described in Table 1 (where mutexes are pre-allocated).

TABLE 2

| | |
|---|---|
| void unlock ( ) | |
| { | //L31 |
|     begin->unlock( ); | //L32 |
| } | //L33 |

In Table 2, the lines in the table are labeled L31–L33 as comments behind the "//" symbol. It will be appreciated that these do not form part of the program code, but are provided to assist in the following explanation of the unlock method of Table 2.

Lines L31 and L33 bracket the unlock method program code.

L32 forms the single line of active program code, which corresponds to step S20 of FIG. 11 (i.e. the mutex at the head of the sequence of mutexes is unlocked). This serves to awaken the thread associated with the next mutex in the sequence. That is the instance of the lock method of Table for the next thread awakens as represented at line L15 in Table 1.

In the example described with reference to Tables 1 and 2, pre-allocation is employed using a circular linked-list storage methodology. It should be understood that pre-allocation of mutexes could be employed irrespective of the storage methodology used in an embodiment. In other words, pre-allocation could be used with any of the storage methodologies described with reference to FIGS. 6–9.

In both of the above exemplary embodiments, it can be seen that a new mutex becomes active at the tail end of a list of active mutexes and it stays in active in the list of active mutexes until it becomes the head mutex in that list of active mutexes. At that time, any previous mutexes in the list will have ceased to be active on being released by the respective threads associated therewith. Thus, it can be seen that the list is controlled in the manner of a first-in-first-out (FIFO) buffer.

Also, it can be seen that the thread that removes and destroys a mutex is not the one that has created it and added it to the mutex list, but is rather the next thread that has requested access to the resource.

The step of adding a mutex in FIG. 10 (operation 1030) can be protected by an internal mutex. Threads that perform the operation of adding a mutex to the list at the same time are deemed such that they cannot be ordered and are considered to be simultaneous. However, the operation of adding a mutex to the list takes a very short time indeed, compared, for example, to the operation of a resource that the main resource access control mechanism is intended to protect.

Figure 12:
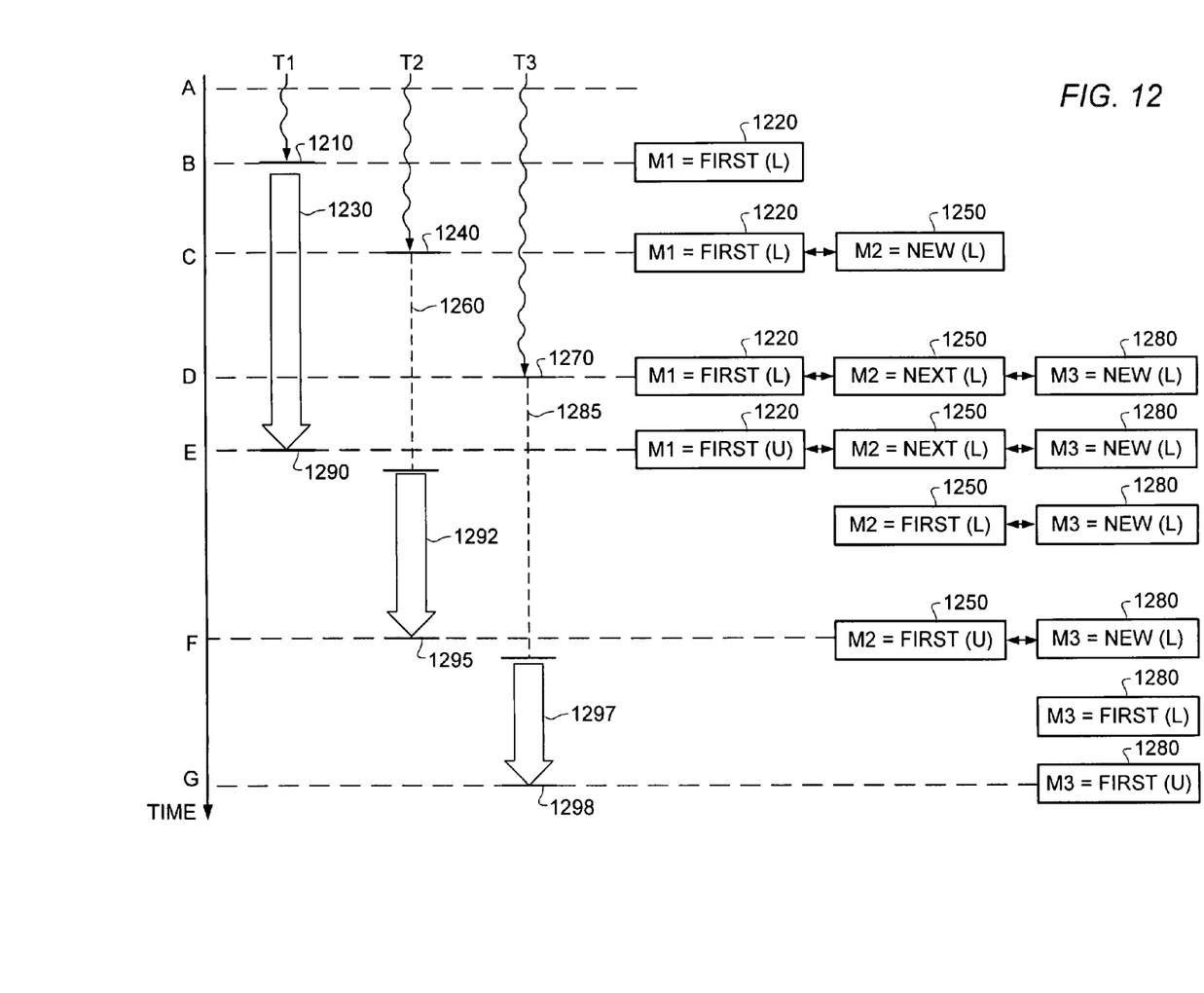
FIG. 12 is a schematic illustration of the operation of an embodiment of the present invention.

To further illustrate an embodiment of the invention, the control of access to a resource by three separate threads is illustrated in FIG. 12. FIG. 12 assumes the use of lock and unlock methods as described in Tables 1 and 2, that is where mutexes are pre-allocated. In FIG. 12, a time axis extends from the top to the bottom of the page. At a first time A the three threads T1, T2 and T3 are considered to be operating but have not requested access to a resource.

At time B, a thread T1 requests access to the resource at 1210 and calls the lock method of Table 1. At that time, the instance of the lock method called by the thread T1 locks (L) a mutex M1 1220 as the head mutex in the list. The thread T1 then commences access to the resource as represented at 1230.

At a subsequent time C, thread T2 requests access to the resource at 1240 and calls the lock method of Table 1. At this time, the instance of the lock method called by the thread T1 locks (L) a new mutex M2 at 1250 for the thread T2 behind the mutex M1. The instance of the lock method called by the second thread T2 also attempts to lock the first mutex M1. However, as the first mutex M1 is already locked (L) and allocated to the thread T1, the second thread T2 is blocked as represented by the dashed line at 1260.

At a further subsequent time D, the third thread T3 requests access to the resource at 1270 and calls the lock method of Table 1. At this time, the instance of the lock method called by the thread T1 locks (L) a new mutex M3 1280 for the thread T3 behind the mutex M2. The instance of the lock method called by the third thread T3 attempts to lock the mutex M2 on behalf of the thread T3. However, as the mutex M2 is locked (L) and is allocated to the thread T2, the thread T3 is blocked as represented by the dashed line at 1285.

At a further subsequent time E, the thread T1 completes the access to the resource at 1290 and calls the unlock method of Table 2. The instance of the unlock method called by thread T1 unlocks the first mutex M1. At this time, the instance of the lock method called by the thread T2 is able to lock the first mutex M1 as there is only one thread T2 waiting for access to the first mutex M1 and therefore there is no order contention issue. The instance of the lock method called by the thread T2 is then operable to unlock the first mutex M1 on behalf of the second thread, and to promote the second mutex M2 to become the head mutex, or controlling mutex, of the list. The thread T2 can then commence access to the resource as represented at 1293.

At a subsequent time F, the second thread T2 completes the access to the resource at 1295 and calls the unlock method of Table 2. The instance of the unlock method called by thread T2 unlocks the second mutex M2. At this time, the instance of the lock method called by the thread T3 is able to lock the second mutex M2 as there is only one thread T3 waiting for access to the second mutex M2 and therefore there is no order contention issue. The instance of the lock method called by the thread T3 is then operable to unlock the second mutex M2 on behalf of the third thread, and to promote the third mutex M3 to become the head mutex of the list. The thread T3 can then commence access to the resource as represented at 1297.

At a subsequent time G, the third thread T3 completes access to the resource at 1298 and calls the unlock method of Table 2. The instance of the unlock method called by thread T3 unlocks the third mutex M3. As, in the example shown in FIG. 3, no further thread is awaiting access to the resource, the mutex M3 remains the head mutex in the list and remains in an unlocked state.

Any subsequent thread (not shown) which requires access to the resource will call the lock method of Table 1. The instance of the lock method called by the further thread will lock (L) a further new mutex (not shown) for the further thread behind the mutex M3. The instance of the lock method called by this further thread will also attempt to lock the third mutex M3. As the mutex M3 is then unlocked, the instance of the lock method called by the further thread will be able first to lock the third mutex M3, then to unlock the third mutex M3 on behalf of the further thread, and to promote the further mutex to become the head mutex of the list. The further thread can then immediately commence access to the resource.

It will be appreciated that the combination of the lock and the unlock method of Tables 1 and 2 forms an example of a secure, efficient, and practical resource access control mechanism and method for enabling synchronization of resource access and order preservation for access to the resource. FIGS. 10 and 11 also describe another example of such resource access control mechanism and method.

As will be apparent from Table 1 and Table 2, the resource access control mechanism can be implemented as computer program elements. The computer program elements can be supplied as a computer program product with program code on a carrier medium. The carrier medium could be a storage medium (such as an optical, a magneto-optical, a magnetic or a solid state storage medium configured as a disk, tape or solid state device, etc), or a transmission medium (such as a telephonic, wireless, copper, optical or other wired medium, etc), or a combination thereof, as appropriate.

Although particular embodiments of the invention have been described, it will be appreciated that many modifications/additions and/or substitutions may be made within the scope of the invention.

What is claimed is:

1. A resource access control mechanism for a multi-thread computing environment, the mechanism being operable:
   to manage a sequence of one or more mutexes, wherein the sequence of mutexes is associated with a resource; and
   when a requesting thread attempts an access to the resource:
      to lock a mutex, wherein the locked mutex is allocated to the requesting thread;
      to make a determination whether the sequence includes a previous mutex; and
      if a result of the determination is positive, to attempt to lock the previous mutex in the sequence, wherein the requesting thread is suspended if the previous mutex is already locked until the previous mutex is unlocked in response to a previous thread finishing access to the resource.

2. The mechanism of claim 1, the mechanism being operable, on attempting to lock the previous mutex in the sequence when the previous mutex is unlocked, to lock the previous mutex on behalf of the requesting thread and then to unlock the previous mutex on behalf of the requesting thread.

3. The mechanism of claim 1, wherein the resource access control mechanism unlocks the mutex allocated to the requesting thread in response to the requesting thread completing access to the resource.

4. The mechanism of claim 1, wherein the mechanism includes an internal mutex operable to protect the locking of the mutex allocated to the requesting thread.

5. The mechanism of claim 1, wherein the resource comprises a print function.

6. The mechanism of claim 1, wherein the sequence of mutexes is held in an array.

7. The mechanism of claim 1, wherein the sequence of mutexes is held in a ring buffer.

8. The mechanism of claim 1, wherein the sequence of mutexes is held in a linked list.

9. The mechanism of claim 1, wherein the sequence of mutexes is held in a circular linked list.

10. A resource access control program for a multi-thread computing environment, the program comprising program code on a storage medium, which program code is operable to manage a sequence of mutexes, wherein the sequence of mutexes is associated with the resource and is operable to respond to a call from a thread requesting access to a resource by:
    locking a mutex for the requesting thread, wherein the mutex is allocated to the requesting thread;
    making a determination whether the sequence includes a previous mutex; and
    if a result of the determination is positive, attempting to lock the previous mutex in the sequence, wherein the requesting thread is suspended if the previous mutex is already locked, until the previous mutex is unlocked in response to a previous thread finishing access to the resource.

11. The program of claim 10, wherein the program code is operable, on attempting to lock the previous mutex in the sequence when the previous mutex is unlocked, to lock the previous mutex on behalf of the requesting thread and then to unlock the previous mutex on behalf of the requesting thread.

12. The program of claim 10, comprising program code operable to respond to a call from the requesting thread completing access to the resource by unlocking the mutex allocated to the requesting thread.

13. The program of claim 10, wherein the program code is operable to control an internal mutex operable to protect the locking of the mutex allocated to the requesting thread.

14. The program of claim 10, wherein the resource comprises a print function.

15. The program of claim 10, wherein the sequence of mutexes is held in an array.

16. The program of claim 10, wherein the sequence of mutexes is held in a ring buffer.

17. The program of claim 10, wherein the sequence of mutexes is held in a linked list.

18. The program of claim 10, wherein the sequence of mutexes is held in a circular linked list.

19. A computer program product comprising program code on a tangible computer readable storage medium, which program code is operable to manage a sequence of one or more mutexes, wherein the sequence of mutexes is associated with a resource, and the program code is further operable to respond to a call from a thread requesting access to the resource by:
   locking a mutex for the requesting thread, wherein the mutex is allocated to the requesting thread;
   making a determination whether the sequence includes a previous mutex; and
   if a result of the determination is positive, attempting to lock the previous mutex in the sequence, wherein if the previous mutex is already locked, the requesting thread is suspended until the previous mutex is unlocked in response to a previous thread finishing access to the resource.

20. The computer program product of claim 19, wherein the tangible computer readable medium comprises a storage medium.

21. The computer program product of claim 19, wherein the tangible computer readable medium comprises a transmission medium.

22. A computer system, comprising:
   a processor;
   a memory storing program instructions for a method for controlling access to a resource for a multi-thread computing environment, wherein upon execution of said program instructions on said processor said method comprises:
      managing a sequence of one or more mutexes, wherein the sequence of mutexes is associated with the resource;
      receiving a request from a thread to access the resource;
      locking a mutex in the sequence for the requesting thread, wherein the mutex is allocated to the requesting thread;
      making a determination whether the sequence includes a previous mutex; and
      if a result of the determination is positive, attempting to lock the previous mutex in the sequence, wherein the requesting thread is suspended if the previous mutex is already locked until the previous mutex is unlocked in response to a previous thread finishing access to the resource.

23. The computer system of claim 22, wherein upon execution of said program instructions on said processor, said method further comprises, after attempting to lock the previous mutex in the sequence:
   locking the previous mutex on behalf of the requesting thread when the previous mutex is unlocked; and
   unlocking the previous mutex on behalf of the requesting thread after the previous mutex is locked on behalf of the requesting thread.

24. The computer system of claim 22, wherein upon execution of said program instructions on said processor, said method further comprises: unlocking the mutex allocated to the requesting thread in response to the requesting thread completing access to the resource.

25. The computer system of claim 22, wherein upon execution of said program instructions on said processor, said method further comprises: locking an internal mutex operable to protect the locking of the mutex allocated to the requesting thread.

26. The computer system of claim 22, wherein the resource comprises a print function.

27. The computer system of claim 22, wherein the sequence of mutexes is held in an array.

28. The computer system of claim 22, wherein the sequence of mutexes is held in a ring buffer.

29. The computer system of claim 22, wherein the sequence of mutexes is held in a linked list.

30. The computer system of claim 22, wherein the sequence of mutexes is held in a circular linked list.

31. The computer system of claim 22, wherein the method stored in the memory comprises a computer program.

32. A method of resource access control for a multi-thread computing environment, the method comprising:
   managing a sequence of one or more mutexes, wherein the sequence of mutexes is associated with a resource;
   receiving a request from a thread to access the resource;
   locking a mutex in the sequence for the requesting thread;
   making a determination whether the sequence includes a previous mutex; and
   if a result of the determination is positive, attempting to lock the previous mutex in the sequence, wherein the requesting thread is suspended if the previous mutex is already locked until the previous mutex is unlocked in response to a previous thread finishing access to the resource.

33. The method of claim 32, further comprising, on attempting to lock the previous mutex in the sequence when the previous mutex is unlocked, locking the previous mutex on behalf of the requesting thread and then unlocking the previous mutex on behalf of the requesting thread.

34. The method of claim 32, further comprising unlocking the mutex allocated to the requesting thread in response to the requesting thread completing access to the resource.

35. The method of claim 32, further comprising managing an internal mutex to protect the locking of the mutex allocated to the requesting thread.

36. The method of claim 32, wherein the resource comprises a print function.

37. The method of claim 32, wherein the sequence of mutexes is held in an array.

38. The method of claim 32, wherein the sequences of mutexes is held in a ring buffer.

39. The method of claim 32, wherein the sequence of mutexes is held in a linked list.

40. The method of claim 32, wherein the sequence of mutexes is held in a circular linked list.

* * * * *